United States Patent
Huang et al.

(10) Patent No.: US 10,680,956 B2
(45) Date of Patent: Jun. 9, 2020

(54) SMALL DATA TRANSMISSION METHOD AND USER EQUIPMENT USING THE SAME

(71) Applicant: Acer Incorporated, New Taipei (TW)

(72) Inventors: Ching-Yao Huang, New Taipei (TW); Chie-Ming Chou, New Taipei (TW)

(73) Assignee: Acer Incorporated, New Taipei (TW)

( * ) Notice: Subject to any disclaimer, the term of this patent is extended or adjusted under 35 U.S.C. 154(b) by 685 days.

(21) Appl. No.: 14/464,714

(22) Filed: Aug. 21, 2014

(65) Prior Publication Data

US 2015/0113128 A1 Apr. 23, 2015

(30) Foreign Application Priority Data

Oct. 22, 2013 (TW) .............................. 102138144 A

(51) Int. Cl.
*H04L 12/801* (2013.01)
*H04W 68/02* (2009.01)

(52) U.S. Cl.
CPC .......... *H04L 47/16* (2013.01); *H04W 68/025* (2013.01)

(58) Field of Classification Search
CPC .............................. H04L 47/16; H04W 68/025
See application file for complete search history.

(56) References Cited

U.S. PATENT DOCUMENTS

| | | |
|---|---|---|
| 2012/0147902 A1 | 6/2012 | Kim et al. |
| 2012/0163311 A1 | 6/2012 | Park |
| 2012/0208545 A1* | 8/2012 | Yang .................... H04W 74/002 455/450 |
| 2012/0254890 A1 | 10/2012 | Li et al. |
| 2012/0275366 A1* | 11/2012 | Anderson ......... H04W 52/0219 370/311 |
| 2012/0282956 A1* | 11/2012 | Kim ....................... H04L 51/38 455/466 |
| 2013/0039297 A1* | 2/2013 | Wang .................. H04W 76/045 370/329 |
| 2013/0080597 A1 | 3/2013 | Liao |

(Continued)

FOREIGN PATENT DOCUMENTS

| | | |
|---|---|---|
| CN | 102404847 | 4/2012 |
| CN | 102572951 | 7/2012 |

(Continued)

OTHER PUBLICATIONS

LTE in Wireless, "Paging in LTE", Nov. 2012, retrieved from lteinwireless.blogspot.com/2012/12/paging-in-lte.html on Apr. 20, 2017.*

*Primary Examiner* — Caroline H Jahnige
(74) *Attorney, Agent, or Firm* — JCIPRNET

(57) ABSTRACT

A small data transmission method, configured for a User Equipment (UE) to transceive a small data from a control node in a wireless network without establishing a Radio Resource Control (RRC) connection, and the method includes but not limited to the step of: monitoring a paging opportunity (PO) sub frame in a paging frame in an idle mode; when an identifier in the PO sub frame corresponding to the UE is detected, receiving a paging message corresponding to the PO sub frame; and analyzing the paging message, and when the paging message includes a small data indicator, extracting a data from an indicating address, in which the data is the small data.

17 Claims, 4 Drawing Sheets

(56) References Cited

U.S. PATENT DOCUMENTS

2013/0315159 A1* 11/2013 Xia .................... H04W 72/042
                                                                 370/329
2014/0321381 A1* 10/2014 Guo ................. H04W 52/0251
                                                                 370/329
2015/0009936 A1*  1/2015 Quan ................. H04W 74/008
                                                                 370/329
2015/0304799 A1* 10/2015 Park ....................... H04W 4/70
                                                                 370/329

FOREIGN PATENT DOCUMENTS

| WO | 2013040752 | 3/2013 | | |
|----|------------|--------|----|----|
| WO | WO 2013040752 A1 * | 3/2013 | ............ | H04W 28/06 |
| WO | WO-2013040752 A1 * | 3/2013 | ............ | H04W 28/06 |

* cited by examiner

SMALL DATA TRANSMISSION METHOD AND USER EQUIPMENT USING THE SAME

CROSS-REFERENCE TO RELATED APPLICATION

This application claims the priority benefit of Taiwan application serial no. 102138144, filed on Oct. 22, 2013. The entirety of the above-mentioned patent application is hereby incorporated by reference herein and made a part of this specification.

BACKGROUND OF THE INVENTION

Field of the Invention

The invention relates to a transmission method, and more particularly, to a small data transmission method and a user equipment using the same.

Description of Related Art

With mobile electronic devices (such as smart phones or tablet computers) being widely used in recent years, mobile data traffics of the mobile electron devices are also gradually increased every year. Sources of the mobile data traffic may be generated by a user operating applications installed on the mobile electronic device (e.g., browsing web pages or chatting on-line), or caused by the applications executed at background. Unlike a data traffic commonly caused by transmitting voices or videos, said mobile data is characterized in that it is not large in a size of the data, but intervals between the data (i.e., a traffic interval) may change dramatically. The data having above-said characteristics may be classified into a type of data called a Diverse Data Application (DDA) data in a standard set by 3rd Generation Partnership Project (3GPP). Said type of data may lead to problems such as a high power consumption and a high signaling overhead. The high power consumption may came from variations of time intervals between data and data being overly big, such that a sleep mode or an idle mode cannot be entered because the mobile electronic device needs to stay connected with a control node (e.g., a base station) in a network, or to perform connecting/disconnecting operations with the control node for receiving said type of data. The high signaling overhead may caused by the constant connecting/disconnecting operations with the control node performed by the mobile electronic device as described above. Since the data size of said type of data is relatively small, the data size required for the connecting/disconnecting operations is usually far greater than that of said type of data to be transmitted. Accordingly, how to prevent the mobile electronic device from the high power consumption or reduce the signaling overhead between the mobile electronic device and the control node in the network has become one of the major problems to be solved in the field.

SUMMARY OF THE INVENTION

The invention is directed to a small data transmission method and a user equipment using the same, and capable of solving problems upon high power consumption and high signal overhead for the user equipment.

A small data transmission method is configured for a User Equipment (UE) to receive a small data from a control node in a wireless network without establishing a Radio Resource Control (RRC) connection, and the method includes but not limited to the step of: monitoring a first paging opportunity sub frame in a paging frame in an idle mode; when an identifier in the first paging opportunity sub frame corresponding to the user equipment is detected, receiving a first paging message corresponding to the first paging opportunity sub frame; and analyzing the first paging message, and when the paging message includes a small data indicator, extracting a data from an indicating address, in which the data is the small data.

A user equipment is provided, which includes a transceiver and a communication protocol unit. The transceiver is configured to receive/transmit a signal from/to a control node. The communication protocol unit is coupled to the transceiver and configured to receive/transmit the signal through the transceiver. Therein, the communication protocol unit monitors a first paging opportunity sub frame in a paging frame through the transceiver in a sleep mode or an idle mode of the user equipment. When the communication protocol unit detects an identifier corresponding to the user equipment in the first paging opportunity sub frame, the communication protocol unit receives a first paging message corresponding to the first paging opportunity sub frame through the transceiver. The communication protocol unit analyzes the first paging message, and when the first paging message includes a small data indicator, the communication protocol unit extracts a data from an indicating address, in which the data is a small data.

Based on above, the small data transmission method and the user equipment are capable of extracting the small data from the indicating address according to instructions in the paging frame, so that the high power consumption and the high signal overhead may both be avoided.

To make the above features and advantages of the disclosure more comprehensible, several embodiments accompanied with drawings are described in detail as follows.

DESCRIPTION OF THE EMBODIMENTS

Figure 1:
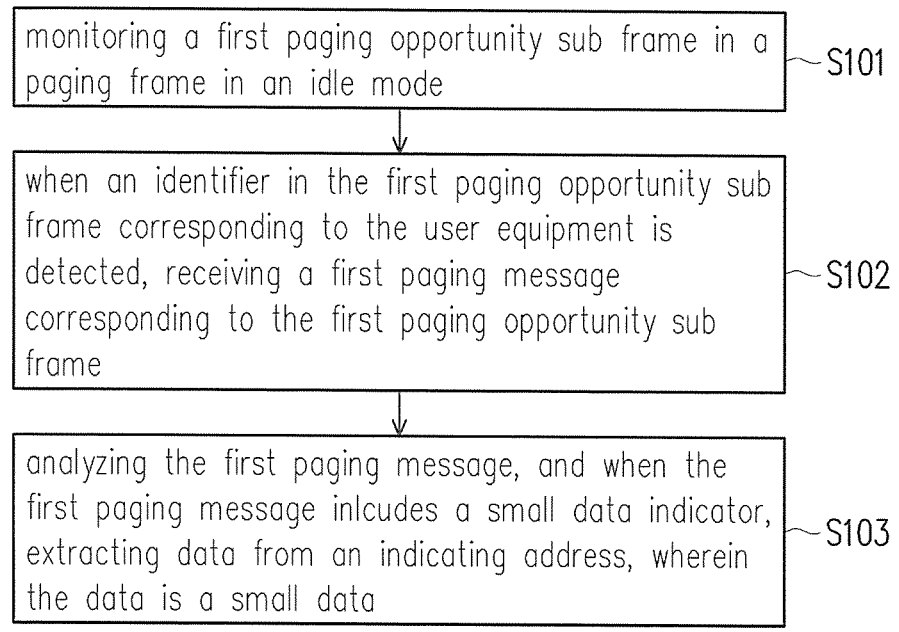
FIG. 1 illustrates a flowchart of a small data transmission method according to an embodiment of the invention.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items", individually or in conjunction with other items and/or other categories of items. Further, as used herein, the term "set" is intended to include any number of items, including zero. Further, as used herein, the term "number" is intended to include any number, including zero.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art. Therefore, the term "base station" in this disclosure could be, for instances, an evolved Node B or eNodeB, a Node-B, a base transceiver system (BTS), an access point, a home base station, a relay station, a scatterer, a repeater, an intermediate node, an intermediary, and/or satellite-based communication base stations, and so forth.

Hereinafter, problems upon the user equipment transmitting a small data are described first, followed by the technical content of the invention.

For example, the user equipment is capable of transmitting messages between a network (which is compatible with communication standards such a 3GPP long term evolution (LTE) and a LTE-advanced (LTE-A)) and a control node in said network. Operating modes of the user equipment include at least two operating modes which are a Radio Resource Control (RRC) CONNECTED state and a RRC IDLE state. In case one user equipment in the network is in the RRC CONNECTED state, the control node may keep information of that user equipment such as an identification information (e.g., ID) and a security information of the user equipment, and a provides a Radio Resource Management (RRM) for the user equipment. A content of the RRM may include information of data scheduling, connection monitoring (e.g., modulation or adaptive coding), handover . . . etc, and the user equipment may then perform operations such as a voice communication or a data communication through the control node.

Since radio resources and network loading are limited, it is difficult for the control node to ensure that all of the user equipments in its coverage are in the RRC CONNECTED state at all times. Accordingly, the control node may release a part of the user equipments in the coverage by using methods such as transmitting a RRC release message according to parameters including an operation status, a connection priority or a Quality of Service (QoS) of the user equipments. Once the user equipment is switched to the RRC IDLE state, it only requires to monitor a paging message of the user equipment periodically. When the control node informs the user equipment that there is a corresponding call or there is a data to be received, the user equipment may establish the RRC connection again through a RRC connection setup, and normally transceive the data from the control node after the connection is established for switching back the RRC CONNECTED state.

The small data as described in the invention usually includes the following characteristics: small in the data size (e.g., less than 1K byte), a longer time interval between data and data as compared to that in data of the voice communication or video communication, and difficulties in predicting a time required for generating and transmitting data (e.g., it may vary based on operations of a user). Therefore, in case the small data is transmitted in a downlink path, a condition is constantly repeated in which the user equipment being waken up from the RRC IDLE state repeatedly for establishing the RRC connection, and entered the RRC IDLE repeatedly once the RRC release message is received. Accordingly, the user equipment may not be able to stay in the RRC IDLE state for a longer time, and may repeatedly connect to the control node, resulting power to be constantly wasted.

On the other hand, when the user equipment establishes the RRC connection with the control node, at least 16 signals exchanges is required between the two, thereby generating a data transmission having more than 176 byte. Besides that a delay problem may be caused by the 16 signals exchanges, the signal transmission may result in an overly high signaling overhead as compared to the small data having less than 1 K, such that an overall data transmission efficiency may be lowered accordingly.

Therefore, the invention provides a small data transmission method and a user equipment using the same, which allows the user equipment to transceive the small data without establishing a RRC connection, so as to solve the problem upon the high power consumption of the user equipment and the high signaling overhead caused by establishing the RRC connection. The present transmission method may be divided into a downlink path transmission and a uplink path transmission, descriptions thereof are provided below with reference to drawings and embodiments.

Firstly, description for a data transmission of the downlink path is provided as below. FIG. 1 illustrates a flowchart of a small data transmission method according to an embodiment of the invention. Therein, the small data transmission method is configured for a user equipment to transceive a small data from a control node in a wireless network without establishing a RRC connection. Referring to FIG. 1, in step S101, a first paging opportunity sub frame in a paging frame is monitored in an idle mode. Next, in step S102, when an identifier in the first paging opportunity sub frame corresponding to the user equipment is detected, a first paging message corresponding to the first paging opportunity sub frame is received. Next, in step S103, the first paging message is analyzed, and when the first paging message includes a small data indicator, a data is extracted from an indicating address, in which the data is the small data.

Figure 2:
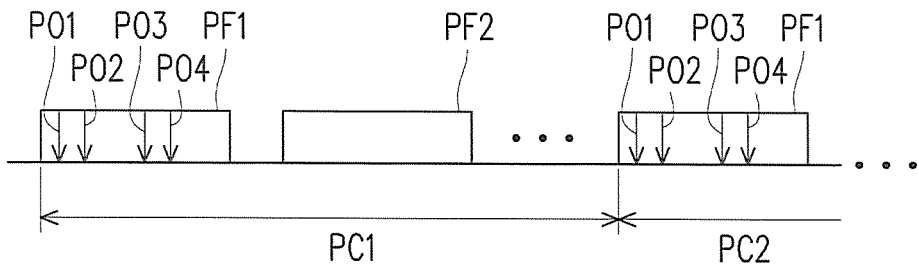
FIG. 2 is a schematic diagram illustrating the paging frame, the paging opportunity sub frame and a paging cycle relation according to an embodiment of the invention.

In brief, when a small data is received by the control node and it intends to transmit the small data to a specific user equipment, the control node may inform that user equipment through a paging channel and transmit the small data through that paging channel. FIG. 2 is a schematic diagram illustrating the paging frame, the paging opportunity sub frame and a paging cycle relation according to an embodiment of the invention. Referring to FIG. 2, a plurality of paging frames transmitted by the control node are included in a paging cycle (PC1 or PC2), such as paging frames PF1 and PF2 depicted in FIG. 2. Each of the paging frames (e.g., the paging frames PF1 and PF2) includes paging opportunity sub frames. For instance, the paging frame PF1 at least includes paging opportunity sub frames P01 to P04.

Each of the paging opportunity sub frames (e.g., the paging opportunity sub frames P01 to P04) is corresponding to one user equipment within a service coverage of the control node. When the control node intends to page the user equipment (e.g., the control node intends to transmit data to the user equipment), the control node may place corresponding information in the paging opportunity sub frame corresponding to the user equipment. In case the user equipment is applied in said LTE/LTE-A network, when the user equipment is in the RRC IDLE state, the user equipment may monitors that whether there is any information included in the paging opportunity sub frame (e.g., the paging opportunity sub frame P01) corresponding to the user equipment itself through a physical downlink control channel (PDCCH) for each time interval of the paging cycle periodically.

In a common paging situation (e.g., when the control node intends to wake up the user equipment for establishing the RRC connection thereby transmitting the data), the control node may place the identifier (e.g., a paging radio network temporary identifier (P-RNTI) as in the LTE/LTE-A network) in the paging opportunity sub frame (e.g., the paging opportunity sub frame P01) corresponding to the user equipment, and place a corresponding message content (e.g., a connection-establishing request, or a system information-updating request) to a paging message.

When the user equipment monitors that the paging message corresponding to the user equipment itself is available through the PDCCH, the user equipment may receive the paging message corresponding to the P-RNTI through a physical downlink shared channel (PDSCH). A paging field corresponding to the user equipment is included in the paging message, and when the user equipment extracts the paging field in the paging message corresponding to the user equipment itself, operations (e.g., the connection-establishing request, or the system information-updating request as described above) required by the control node may then be obtained.

In the present embodiment, when the control node intends to transmit the small data to the user equipment, the control node may place a small data indicator in the paging field in the paging message corresponding to the user equipment. When the user equipment extracts the paging field in the paging message corresponding to the user equipment itself and the small data indicator is included in the paging field, the user equipment may be determined to obtain the small data from an indicating address. Descriptions regarding how to inform the user equipment about the indicating address and the exact location of the indicating address are described with reference to the embodiments below.

Figure 3:
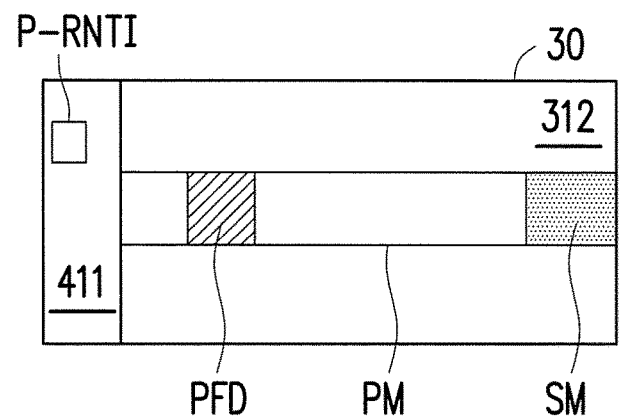
FIG. 3 illustrates a relation between the paging message and the small data according to an embodiment of the invention.

FIG. 3 illustrates a relation between the paging message and the small data according to an embodiment of the invention. In the present embodiment, the small data is appended to the paging message. Referring to FIG. 3, after the P-RNTI is decoded by the user equipment from a paging opportunity sub frame 30 through a PDCCH 411, the user equipment may further obtain a paging message PM entirely through a PDSCH 312. When the user equipment extracts a paging field PFD in the paging message PM corresponding to the user equipment itself, the user equipment may identify that the small data indicator is included in the paging field PFD. In the present embodiment, the control node may also store information of the indicating address in the paging field PFD while placing the small data indicator. For instance, in the present embodiment, the indicating address of a small data SM stored in the paging message PM includes a data sequence, a data size or a small data initial position and a small data end position. When the user equipment identifies that the small data indicator is included in the paging field PFD, the user equipment may further extract the indicating address of the small data in the paging field PFD, and extract the small data from the paging message PM according to the indicating address.

It should be noted that, one single paging opportunity sub frame 30 may corresponds to multiple user equipments (by using different P-RNTIs and different paging fields PFD in the paging message PM). In the present embodiment, the method of appending the small data into the paging message PM may actually allow the small data to be broadcasted to the user equipments corresponding to the same paging opportunity sub frame 30. Since the small data usually includes a specific security mechanism, problems upon privacy/security issue may not be derived. However, a problem of undesired data being received while receiving the paging message PM each time still exists (i.e., extra overhead caused by the small data).

Figure 4:
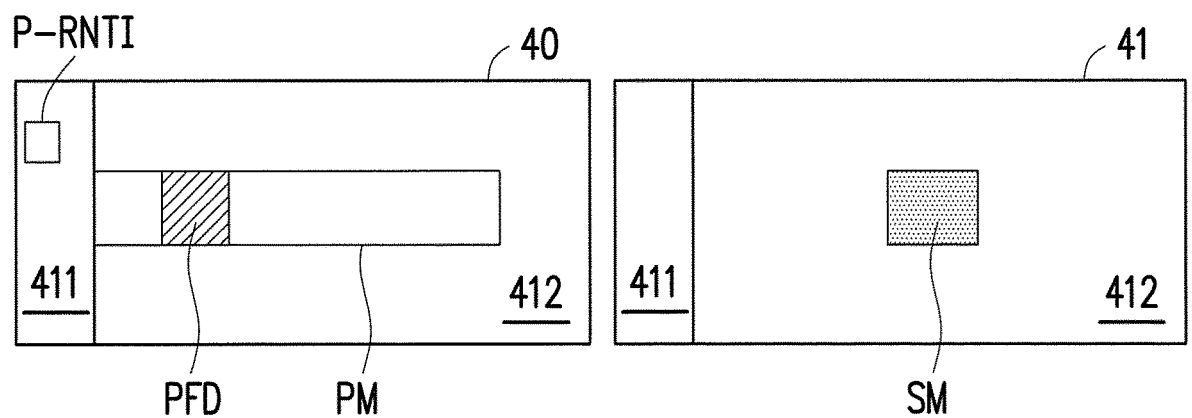
FIG. 4 illustrates a relation between the paging message and the small data according to another embodiment of the invention.

FIG. 4 illustrates a relation between the paging message and the small data according to another embodiment of the invention. Unlike the embodiment depicted in FIG. 3, the indicating address for storing the small data is located at another frame. In the present embodiment, after the P-RNTI is decoded by the user equipment from a paging opportunity sub frame 40 through a PDCCH 411, the user equipment may further obtain a paging message PM through a PDSCH 412. When the user equipment extracts the paging field PFD in the paging message PM corresponding to the user equipment itself and identifies that the small data indicator is included in the paging field PFD, the user equipment may further extract the indicating address of the small data SM in the paging field PFD. In the present embodiment, since the indicating address is located at a next sub frame 41, the user equipment may receive the next sub frame 41 after receiving the paging opportunity sub frame 40 and extract the small data SM from the next sub frame according to information of the indicating address stored in the paging field PFD.

The next sub frame 41 may be any paging opportunity sub frame or a sub frame of downlink path transmission as long as they may be indicated clearly by the control node in the information of the indicating address. For instance, the next sub frame 41 may be a sub frame that provides a paging opportunity, or a sub frame that provides the data of the downlink path transmission. In the present embodiment, the next sub frame 41 and the paging opportunity sub frame 40 are located at the same frame, and the next sub frame 41 is a paging opportunity sub frame at a next time point after a time point of the paging opportunity sub frame 40. However, the sub frame including the indicating address may be set based on actual conditions, and the invention is not limited to the above.

In addition, since the control node may arrange the user equipments corresponding to each paging opportunity sub frame, the control node is capable of reducing the number of the user equipments corresponding to the next sub frame 41 where the small data SM is placed, or placing a plurality of small data together in the same paging opportunity sub frames (e.g., the paging opportunity sub frame 41). Accordingly, the extra overhead to other user equipments caused by the small data SM as shown in the embodiment of FIG. 3 may then be avoided. Nonetheless, in the present embodiment, it is required for the user equipment to receive the next sub frame 41 at the next time point after the time point of receiving the paging opportunity sub frame 40 (or after a few more time points later). Accordingly, a little delay in time may occur on the receiving the small data of the present embodiment as in comparison to the embodiment depicted in FIG. 3. Basically, such delay in time for the small data signal is still acceptable to the user.

Besides the embodiments depicted in FIG. 3 and FIG. 4, in an embodiment of the invention, the control node may include the information of the indicating address in a RRC release message, and when the small data indicator in the paging field PFD is identified, the user equipment may directly extract the small data from the indicating address. In comparison to the embodiments depicted in FIG. 3 and FIG. 4, such arrangement is advantageous in that, a data size of the paging message (e.g., the paging message PM depicted in FIG. 3 and FIG. 4) may be reduced, so that the extra overhead of data is also reduced for the user equipment corresponding to the same paging opportunity sub frame. However, such arrangement is less flexible as compared to the embodiments depicted in FIG. 3 and FIG. 4. In the present embodiment, the information of the indicating address is included in the RRC release message, which means that the control node must transmit the small data to the user equipment by using that indicating address until the next time the RRC connection is re-established between the user equipment and the control node. On the other hand, the arrangement in the embodiments depicted in FIG. 3 and FIG. 4 has not such limitation, and the indicating address of the small data may be dynamically adjusted whenever the small data is to be transmitted.

In brief, regardless of what kind of manners for transmitting the information of the indicating address is used together with a placing location of the small data, the user equipment may receive the corresponding small data from the control node by simply monitoring the corresponding paging opportunity sub frame without establishing the RRC connection with the control node.

Description regarding to the small data transmission of the uplink path (i.e., transmitting the small data from the user equipment to the control node) is provided below. Generally, when the user equipment intends to transmit data (audio/video data or the small data as describe above), the data may be transmitted only if the RRC connection is established with the control node. In the invention, when the RRC release message is transmitted by the control node, a specific preamble signal is included in the RRC release message.

When the user equipment intends to transmit the small data to the control node, the user equipment may transmit the specific preamble signal to the control node through the physical random access channel (PRACH). When the control node receives the specific preamble signal instead of a preamble signal generally used for establishing the RRC connection, the control node may then identify that the user equipment transmitting the specific preamble signal intends to transmit a small data. Accordingly, the control node may then transmit a random access (RA) response message to the user equipment. In this case, the RA response message is used to inform the user equipment that the small data may be transmitted instead of informing the user equipment to establish the RRC connection with the control node. When the RA response message is received by the user equipment, the user equipment may have the small data appended to a RRC connection-establishing request to be transmitted to the control node. Since the control node has already identified that the user equipment intends to transmit the small data instead transmitting the RRC connection-establishing request for establishing the RRC connection, the control node may extract the small data from the RRC connection-establishing request and transmitting the same to a corresponding destination through the network.

As a result, each time the user equipment intends to transmit the small data to the control node, the user equipment no longer requires the RRC connection to be established with the control node, such that the signaling overhead of the at least 16 signal exchanges (including the additional data of 176 byte) required by the RRC connection may be eliminated. This allows a more effective transmission while reducing the delay in time caused by establishing the RRC connection. In case the user equipment is an electronic device such as a smart meter, when the small data is periodically transmitted through a machine type communication (MTC) network, even more of the signaling overhead may be saved.

It should be noted that, since the amount of the specific preamble signals is limited, and more than one among the user equipments served by single one control node may intend to transmit the small data at the same time, thus in an embodiment of the invention, the specific preamble signal may include a validity duration, namely, it is semi-reserved. When the validity duration of the specific preamble signal to be used by the user equipment is overdue, the user may not be able to transmit the small data through the above-said method. In this case, it may require the RRC connection to be established again, so that the specific preamble signal with the validity duration may obtained again when the RRC release message is received once again.

Figure 5:
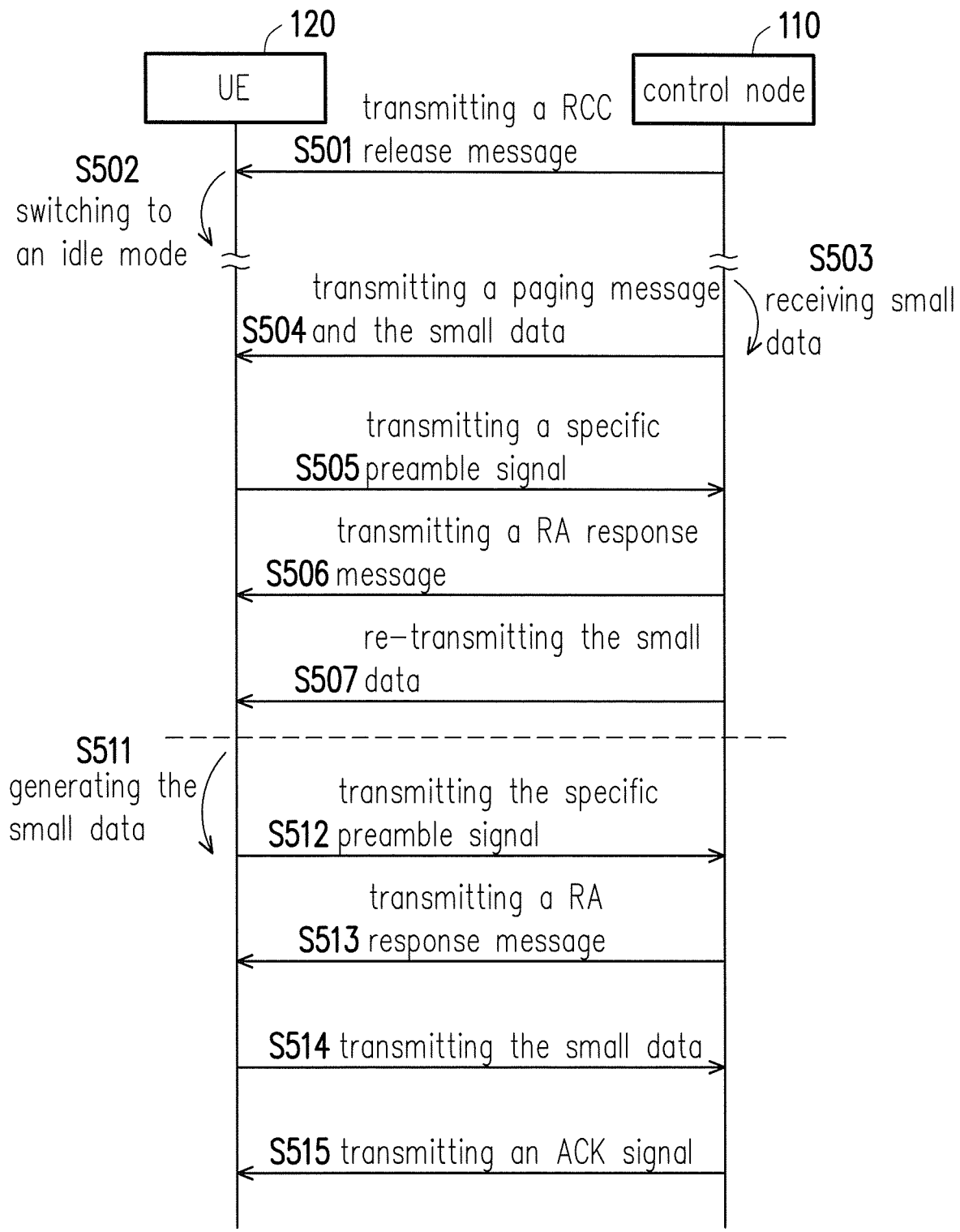
FIG. 5 is a flowchart illustrating timings of a small data transmission system according to an embodiment of the invention.

FIG. 5 is a flowchart illustrating timings of a small data transmission system according to an embodiment of the invention, in which the small data transmission method is illustrated in a signal transmission flow with more details. On the other hand, the small data transmission system 10 could also be directly integrated into an existing system without having any conflicts to existing data transmission mechanisms.

Referring to FIG. 5, the small data transmission system 10 includes a control node 110 and a user equipment 120. Therein, before step S501 is executed, the user equipment 120 may need to exchange some information with control node 110, such as transmitting a request for the control node 110 to provide the small data transmission services. Once the request for the services providing the small data transmission is approved by the control node 110, the control node 110 and the user equipment 120 may then continue the communication regarding conditions for the small data in: a package size, a transmission period or an interval, an absolute timing of the transmission, and/or a robustness requirement.

When the communication regarding said conditions is completed, and the RRC connection between the control node 110 and the user equipment 120 is to be released, the control node 110 may transmit the RRC release message to the user equipment 120 (step S501). When the RRC release message is received by the user equipment, the idle mode (i.e., the RRC IDLE state) may be switched to, so as to periodically monitor the paging frame (step S502). It should be noted that, the control node 110 may have a part of the information for the small data transmission (e.g., the specific preamble signal, the validity duration for using the specific preamble signal, or even the indicating address of the small data of the downlink path) included in the RRC release message, which may be set differently based on different implementations.

When the user equipment 120 is in the idle mode and the small data corresponding to the user equipment is received by the control node 110 from the network (step S503), the control node 100 may transmit the message including the paging opportunity sub frame corresponding the user equipment 120 and the small data to the user equipment 120 (step S504). The small data transmission method may refer to the foregoing embodiments (e.g., the embodiments as illustrated in FIG. 3 and FIG. 4), thus related description thereof is omitted hereinafter. When the small data is extracted successfully by the user equipment 120 from the indicating address, the user equipment 120 may transmit an acknowledgment (ACK) signal including a specific preamble signal to the control node 110. When the small data cannot be extracted successfully by the user equipment 120 from the indicating address, the user equipment 120 may transmit a negative acknowledgment (NACK) signal to the control node 110 (step S505).

It should be noted that, the user equipment 120 may transmit the ACK or the NACK signals through the PRACH. The specific preamble signal included in the ACK or the NACK signals may be identical to or different from the specific preamble signal used in the small data transmission of the uplink path. In the case that the specific preamble signal included in the ACK or the NACK signals is different from the specific preamble signal used in the small data transmission for the uplink path, the user equipment 120 may also obtain the specific preamble signal included in the ACK or the NACK signals from the RRC release message.

In another embodiment of the invention, said specific preamble signal would not be included in the ACK or NACK signals, but the ACK or NACK signals would be transmitted through a specific slot in the PRACH. In yet another embodiment of the invention, the ACK or NACK signals would include said specific preamble signal, and would also be transmitted through the specific slot in the PRACH. Similarly, related information of the specific slot indicated by the ACK/NACK may also be included in the RRC release message to be transmitted to the user equipment 120.

Referring back to FIG. 5, when the ACK signal is received by the control node 110 from the user equipment 120, it means that the current data transmission of the downlink path is completed. When the NACK signal is received by the control node 110 from the user equipment 120, or none of the ACK or NACK signals are received after the small data is transmitted for a predetermined time, the control node 110 may determined that the small data is not transmitted successfully. Accordingly, the control node 110 may transmit the RA response message to the user equipment 120, so as to inform the user equipment 120 that the small data is going to be transmitted again, the small data is then re-transmitted by using the transmission method in step S504 (steps S506 and S507). In other words, steps S506 and S507 would not be executed if the small data is transmitted successfully.

Step S511 to S515 are a flow for the small data transmission of the uplink path. Referring back to FIG. 5, when the small data (e.g., delivery data) is generated by the user equipment 120 (e.g., generated through operations of the user, or generated repeatedly) (step S511), the user equipment 120 may inform the control node that the user equipment 120 intends to transmit a small data by transmitting the specific preamble signal to the control node 110 through the PRACH. When the PRACH is stuck or crashed, the user equipment 120 may auto back-off for a predetermined time point and re-transmits the specific preamble signal (step S512). After the specific preamble signal is received by the control node 110, the control node 110 may transmit the RA response message to the user equipment 120, so as to inform the user equipment that the small data may now be transmitted (step S513). When the RA response message is received by the user equipment, the user equipment may transmit the small data to the control node 110 (e.g., the small data is appended in the RRC connection-establishing message) (step S514). Since the control node 110 has already identified that the user equipment 120 only intends to transmit the small data according to the specific preamble signal, the control node 100 may then extract the small data. In case the small data is extracted successfully by the control node 110, the ACK signal is transmitted back to the user equipment 120 (step S515). In case the small data is not extracted successfully by the control node 110, the NACK signal is transmitted by the control node 110 back to the user equipment 120. When the NACK signal is received by the user equipment 120, or when none of the ACK or NACK signals transmitted from the control node 110 are received by the user equipment 120 within the predetermined time after transmitting the small data, the user equipment 120 may repeat said steps S512 to S514 to re-transmit the small data.

Figure 6:
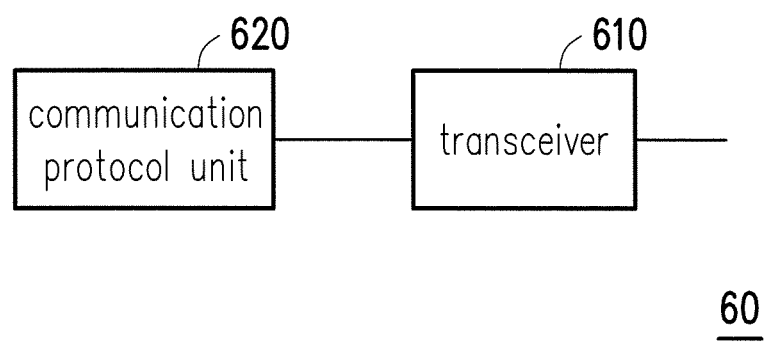
FIG. 6 is a functional block diagram illustrating the user equipment according to an embodiment of the invention.

The invention also provides a user equipment configured for above-said method for small data transmission. FIG. 6 is a functional block diagram illustrating the user equipment according to an embodiment of the invention. Referring to FIG. 6, a user equipment 60 includes a transceiver 610 and a communication protocol unit 620. The transceiver 610 is configured to receive/transmit a signal from/to a control node. The communication protocol unit 620 is coupled to the transceiver 610 and configured to receive/transmit the signal through the transceiver 610. Therein, the communication protocol unit 620 monitors a first paging opportunity sub frame in a paging frame through the transceiver in a sleep mode or an idle mode of the user equipment 60. When an identifier in the first paging opportunity sub frame corresponding to the user equipment is detected by the communication protocol unit 620, the communication protocol unit 620 receives a first paging message corresponding to the first paging opportunity sub frame through the transceiver 610. The communication protocol unit 620 analyzes the paging message, and when the first paging message includes a small data indicator, the communication protocol unit 620 extracts a data from an indicating address, in which the data is a small data.

In one embodiment of the invention, the communication protocol unit 620 receives the first paging message through the transceiver 610, and extracts the indicating address from a paging field corresponding to the identifier in the first paging message. And, the communication protocol unit 620 extracts the data from the indicating address in the first paging message according to the indicating address.

In one embodiment of the invention, the communication protocol unit 620 extracts the indicating address from a paging field in the first paging message corresponding to the identifier. And, the communication protocol unit 620 controls the transceiver 610 to receive a second paging message, and extracts the data from the indicating address in the second paging message according to the indicating address, wherein a second paging opportunity sub frame corresponding to the second paging message and the first paging opportunity sub frame are located at the same paging frame.

In one embodiment of the invention, the identifier is a paging radio network temporary identifier, and the communication protocol unit 620 controls the transceiver 610 to detect whether the identifier is included in the first paging opportunity sub frame through a physical downlink control channel.

In one embodiment of the invention, the communication protocol unit 620 controls the transceiver 610 to receive the first paging message corresponding to the first paging opportunity sub frame through a physical downlink shared channel.

In one embodiment of the invention, when the data is extracted successfully, the communication protocol unit 620 controls the transceiver to transmit an acknowledgment signal to the control node through a physical random access channel. And, when the data is not extracted successfully, the communication protocol unit 620 controls the transceiver 610 to transmit a negative acknowledgment signal to the control node through the physical random access channel, wherein the acknowledgment signal and the negative acknowledgment signal comprises a specific preamble signal, and/or the acknowledgment signal and the negative acknowledgment signal are transmitted through a specific slot in the physical random access channel.

In one embodiment of the invention, when a radio resource control connection release message is received by the user equipment 620 in an connection-established mode, the communication protocol unit switches the user equipment to the idle mode.

In one embodiment of the invention, the radio resource control connection release message comprises the indicating address.

In the embodiment of described above, the radio resource control connection release message comprises a specific preamble signal. The user equipment 60 generates a delivery data and transmits the delivery data to the communication protocol unit 620, wherein the data is the small data. The communication protocol unit 620 controls the transceiver 610 to transmit the specific preamble signal to the control node. And when a connection response in response to the specific preamble signal is received through the transceiver 610 from the control node, the communication protocol unit 620 transmits a connection-establishing request including the delivery data to the control node.

Also, the communication protocol unit 620 controls the transceiver 610 to transmit the specific preamble signal to the control node through the physical random access channel. And, the connection-establishing request is a radio resource control connection-establishing request.

Detailed implementation regarding the user equipment (UE) 60 may refer to the embodiments depicted in FIG. 1 to FIG. 5, thus related description thereof is omitted hereinafter.

However, it should be noted that, the communication protocol unit 620 may be implemented as a hardware circuit which may be integrated with a baseband processing chip in the user equipment, or integrated with a processor in the user equipment. Moreover, the communication protocol unit 620 of the invention may also be implemented as program executable codes stored in a memory and executed by a processing unit in the user equipment 60, but the invention is not limited to the above.

Based on above, the invention provides a small data transmission method and a user equipment using the same, capable of being integrated in existing networks, and transmitting the small data without establishing the RRC connection with the control node (e.g., the base station). For instance, in the downlink path, the control node may inform the user equipment through the paging message, so that the user equipment may extract the small data from the indicating address. In the uplink path, the user equipment may transmit the small data by transmitting the specific preamble signal. Accordingly, the user equipment is no longer required to be switched between RRC CONNECTED state and the RRC IDLE state and causing the high power consumption thereby. Moreover, the delay in time or additional signaling overhead caused by establishing the RRC connection repeatedly may also be avoided.

What is claimed is:

1. A small data transmission method, configured for a user equipment to transceive a small data from a control node in a wireless network without establishing a radio resource control (RRC) connection, and the method comprises:
monitoring a first paging opportunity sub frame in a paging frame in a RRC idle mode;
when a paging radio network temporary identifier (P-RNTI) in the first paging opportunity sub frame corresponding to the user equipment is detected, receiving a first paging message corresponding to the first paging opportunity sub frame in the RRC idle mode; and
analyzing the first paging message to extract a paging field corresponding to the user equipment, and when identifying a small data indicator included in the paging field of the first paging message corresponding to the P-RNTI in the RRC idle mode, extracting data from a second paging message according to an indicating address in the RRC idle mode by extracting the indicating address of the data from the paging field corresponding to the P-RNTI in the first paging message, wherein the data is the small data, and the indicating address of the data includes a data sequence, a small data initial position, and a small data end position,
wherein receiving the first paging message corresponding to the first paging opportunity sub frame comprises:
receiving the first paging message corresponding to the first paging opportunity sub frame through a physical downlink shared channel (PDSCH),
wherein extracting data from the second paging message according to the indicating address in the RRC idle mode by extracting the indicating address of the data from the paging field corresponding to the P-RNTI in the first paging message comprises:
receiving the second paging message corresponding to a second paging opportunity sub frame through the PDSCH.

2. The small data transmission method of claim 1, wherein the second paging opportunity sub frame corresponding to the second paging message and the first paging opportunity sub frame are located at the same paging frame.

3. The small data transmission method of claim 1, wherein the step of monitoring the first paging opportunity sub frame in the paging frame comprises:
detecting whether the P-RNTI is included in the first paging opportunity sub frame through a physical downlink control channel (PDCCH).

4. The small data transmission method of claim 1, wherein after the step of extracting the data from the second paging message according to the indicating address, the method further comprises:
when the data is extracted successfully, transmitting an acknowledgment signal (ACK) to the control node through a physical random access channel (PRACH); and
when the data is not extracted successfully, transmitting a negative acknowledgment signal (NACK) to the control node through the physical random access channel,
wherein the acknowledgment signal and the negative acknowledgment signal comprises a specific preamble signal, and/or the acknowledgment signal and the negative acknowledgment signal are transmitted through a specific slot in the physical random access channel.

5. The small data transmission method of claim 1, wherein before the step of monitoring the paging frame, the method further comprises:
when a radio resource control connection (RRC) release message is received in a connection-established mode, switching the user equipment to the idle mode.

6. The small data transmission method of claim 5, wherein:

the radio resource control connection release message comprises the indicating address.

7. The small data transmission method of claim 5, wherein the radio resource control connection release message comprises a specific preamble signal, and the method further comprises:
generating a delivery data, wherein the delivery data is the small data;
transmitting the specific preamble signal to the control node; and
when a connection response in response to the specific preamble signal is received from the control node, transmitting a connection-establishing request including the delivery data to the control node.

8. The small data transmission method of claim 7, wherein the connection-establishing request is a radio resource control connection-establishing request, and the step of transmitting the specific preamble signal to the control node comprises:
transmitting the specific preamble signal to the control node through a physical random access channel.

9. The small data transmission method of claim 1, wherein the data is Diverse Data Application (DDA) data.

10. A user equipment, comprising:
a transceiver configured to receive/transmit a signal from/to a control node; and
a communication protocol unit coupled to the transceiver and configured to receive/transmit the signal through the transceiver,
wherein the communication protocol unit monitors a first paging opportunity sub frame in a paging frame through the transceiver in a sleep mode or a radio resource control (RRC) idle mode of the user equipment;
when the communication protocol unit detects a paging radio network temporary identifier (P-RNTI) corresponding to the user equipment in the first paging opportunity sub frame, the communication protocol unit receives a first paging message corresponding to the first paging opportunity sub frame through the transceiver in the RRC idle mode; and
the communication protocol unit analyzes the first paging message to extract a paging field corresponding to the user equipment, and when identifying a small data indicator included in the paging field of the first paging message corresponding to the P-RNTI in the RRC idle mode, the communication protocol unit extracts data from a second paging message according to an indicating address in the RRC idle mode by extracting the indicating address of the data from the paging field corresponding to the P-RNTI in the first paging message, wherein the data is a small data, and the indicating address of the data includes a data sequence, a small data initial position, and a small data end position,
wherein the communication protocol unit controls the transceiver to receive the first paging message corresponding to the first paging opportunity sub frame and to receive the second paging message corresponding to a second paging opportunity sub frame through a physical downlink shared channel.

11. The user equipment of claim 10, wherein:
the second paging opportunity sub frame corresponding to the second paging message and the first paging opportunity sub frame are located at the same paging frame.

12. The user equipment of claim 10, wherein the communication protocol unit controls the transceiver to detect whether the P-RNTI is included in the first paging opportunity sub frame through a physical downlink control channel.

13. The user equipment of claim 10, wherein:
when the data is extracted successfully, the communication protocol unit controls the transceiver to transmit an acknowledgment signal to the control node through a physical random access channel; and
when the data is not extracted successfully, the communication protocol unit controls the transceiver to transmit a negative acknowledgment signal to the control node through the physical random access channel,
wherein the acknowledgment signal and the negative acknowledgment signal comprises a specific preamble signal, and/or the acknowledgment signal and the negative acknowledgment signal are transmitted through a specific slot in the physical random access channel.

14. The user equipment of claim 10, wherein:
when a radio resource control connection release message is received by the user equipment in an connection-established mode, the communication protocol unit switches the user equipment to the idle mode.

15. The user equipment of claim 14, wherein:
the radio resource control connection release message comprises the indicating address.

16. The user equipment of claim 14, wherein the radio resource control connection release message comprises a specific preamble signal;
the user equipment generates a delivery data and transmits the delivery data to the communication protocol unit, wherein the delivery data is the small data;
the communication protocol unit controls the transceiver to transmit the specific preamble signal to the control node; and
when a connection response in response to the specific preamble signal is received through the transceiver from the control node, the communication protocol unit transmits a connection-establishing request including the delivery data to the control node.

17. The user equipment of claim 16, wherein:
the communication protocol unit controls the transceiver to transmit the specific preamble signal to the control node through the physical random access channel; and
the connection-establishing request is a radio resource control connection-establishing request.

* * * * *